United States Patent

Mikhail et al.

[11] Patent Number: 6,137,187
[45] Date of Patent: Oct. 24, 2000

[54] VARIABLE SPEED WIND TURBINE GENERATOR

[75] Inventors: Amir S. Mikhail; Craig L. Christenson; Kevin L. Cousineau, all of Tehachapi; William L. Erdman, Brentwood; William E. Holley, Pleasanton, all of Calif.

[73] Assignee: Zond Energy Systems, Inc., Tehachapi, Calif.

[21] Appl. No.: 08/907,513

[22] Filed: Aug. 8, 1997

[51] Int. Cl.[7] .................................................. H02P 9/00
[52] U.S. Cl. ................................................ 290/44; 290/55
[58] Field of Search .................................... 290/44, 55

[56] References Cited

U.S. PATENT DOCUMENTS

| | | | |
|---|---|---|---|
| 4,461,957 | 7/1984 | Jallen | 290/44 |
| 4,525,633 | 6/1985 | Wertheim et al. | 290/44 |
| 4,695,736 | 9/1987 | Doman et al. | 290/44 |
| 4,700,081 | 10/1987 | Kos et al. | 290/44 |
| 4,703,189 | 10/1987 | DiValentin et al. | 290/44 |
| 4,794,316 | 12/1988 | Uchino et al. | 322/47 |
| 4,906,060 | 3/1990 | Claude | 322/29 |
| 4,994,684 | 2/1991 | Lauw et al. | 290/52 |
| 5,028,804 | 7/1991 | Lauw | 290/40 |
| 5,083,039 | 1/1992 | Richardson et al. | 290/44 |
| 5,225,712 | 7/1993 | Erdman | 290/44 |
| 5,289,041 | 2/1994 | Holley | 290/44 |
| 5,418,446 | 5/1995 | Hallidy | 322/28 |

FOREIGN PATENT DOCUMENTS

| | | |
|---|---|---|
| 580542A | 1/1994 | European Pat. Off. . |
| 205515 | 12/1923 | France . |
| 2056183A | 3/1981 | United Kingdom . |
| 2206130A | 12/1988 | United Kingdom . |
| 2054975A | 2/1991 | United Kingdom . |
| WO 96/30669 | 10/1996 | WIPO . |
| WO 97/04521 | 2/1997 | WIPO . |

*Primary Examiner*—Nick Ponomarenko
*Attorney, Agent, or Firm*—Blakely, Sokoloff, Taylor & Zafman LLP

[57] ABSTRACT

A variable speed system for use in systems, such as, for example, wind turbines, is described. The system comprises a wound rotor induction generator, a torque controller and a proportional, integral derivative (PID) pitch controller. The torque controller controls generator torque using field oriented control, and the PID controller performs pitch regulation based on generator rotor speed.

33 Claims, 10 Drawing Sheets

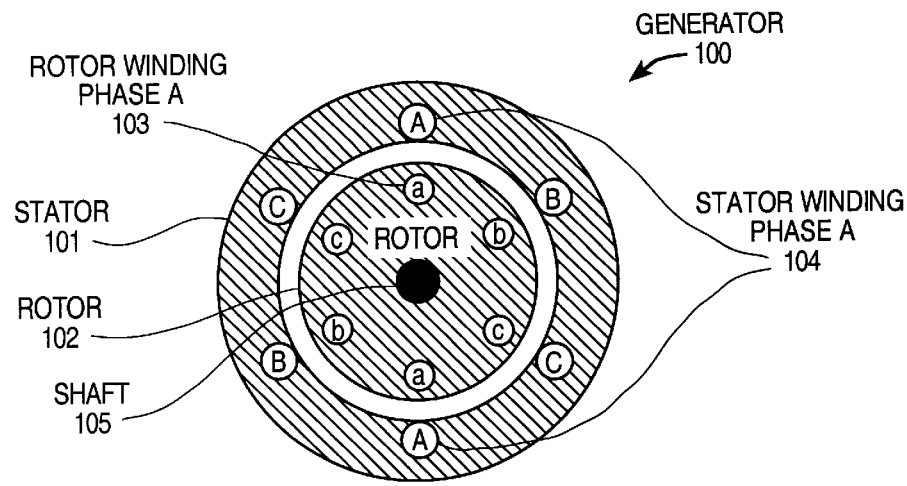
FIG_1 (PRIOR ART)
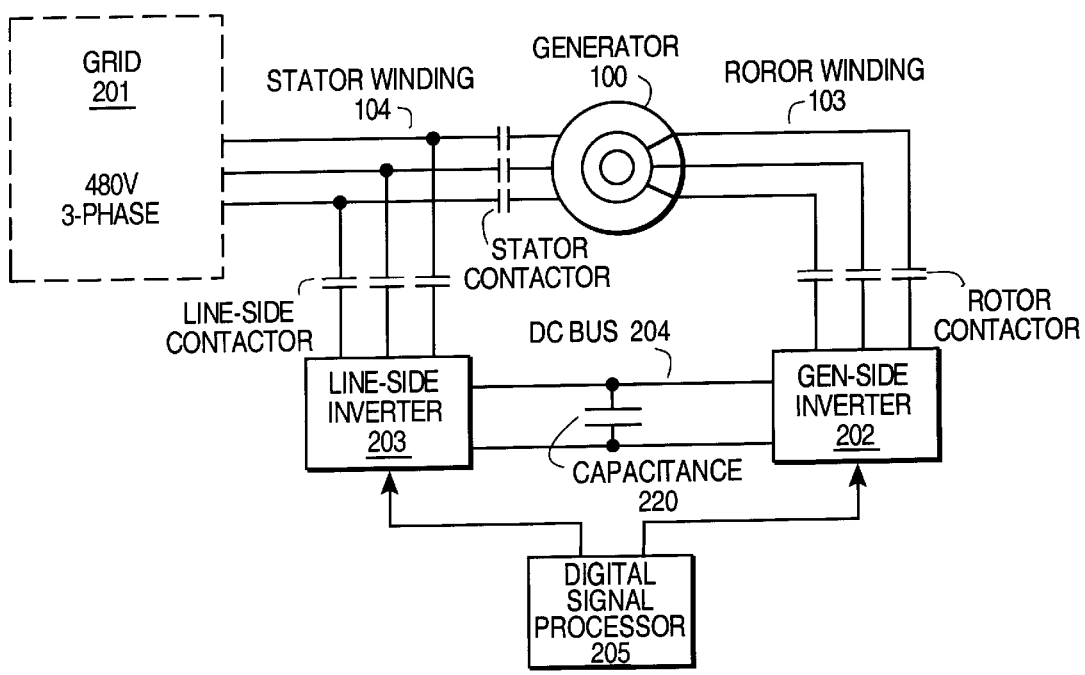
FIG_2 (PRIOR ART)

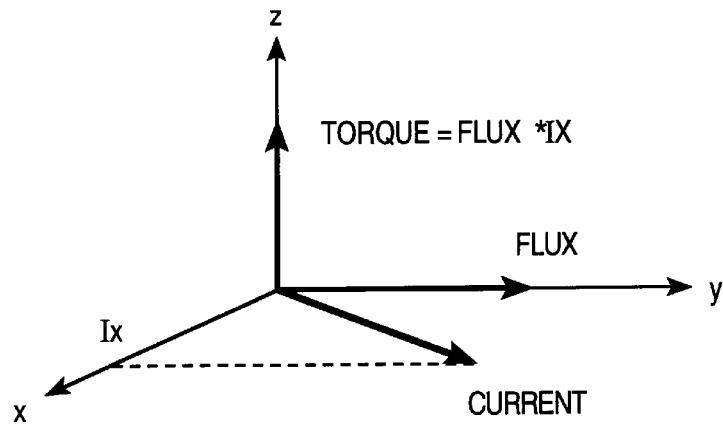
FIG_3 (PRIOR ART)
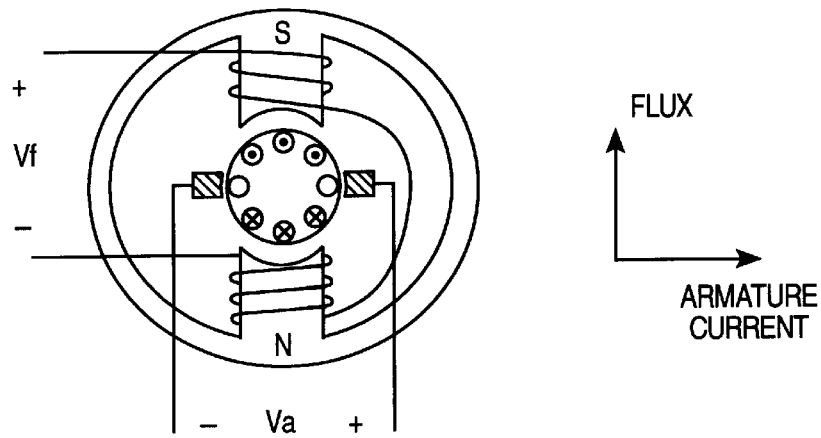
FIG_4 (PRIOR ART)
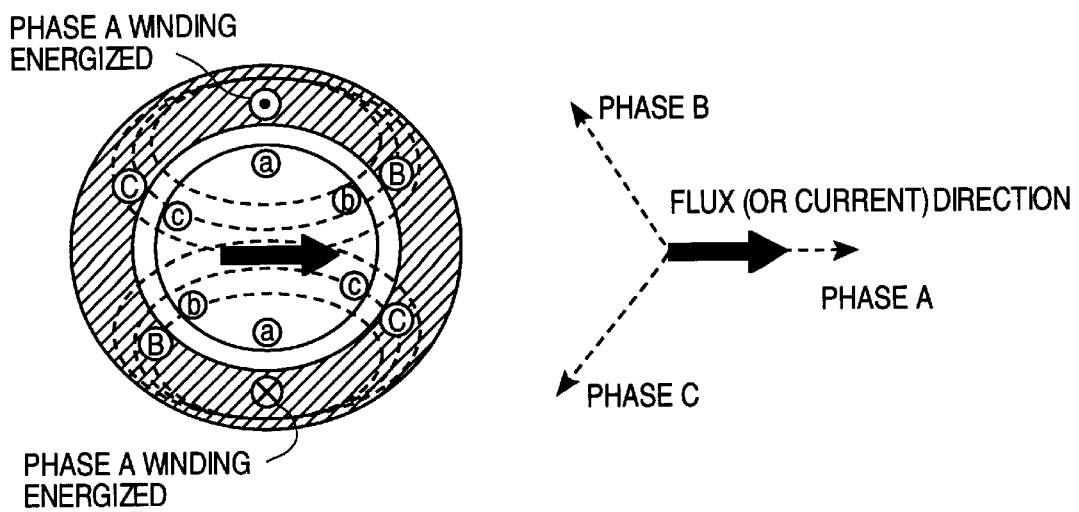
FIG_5 (PRIOR ART)

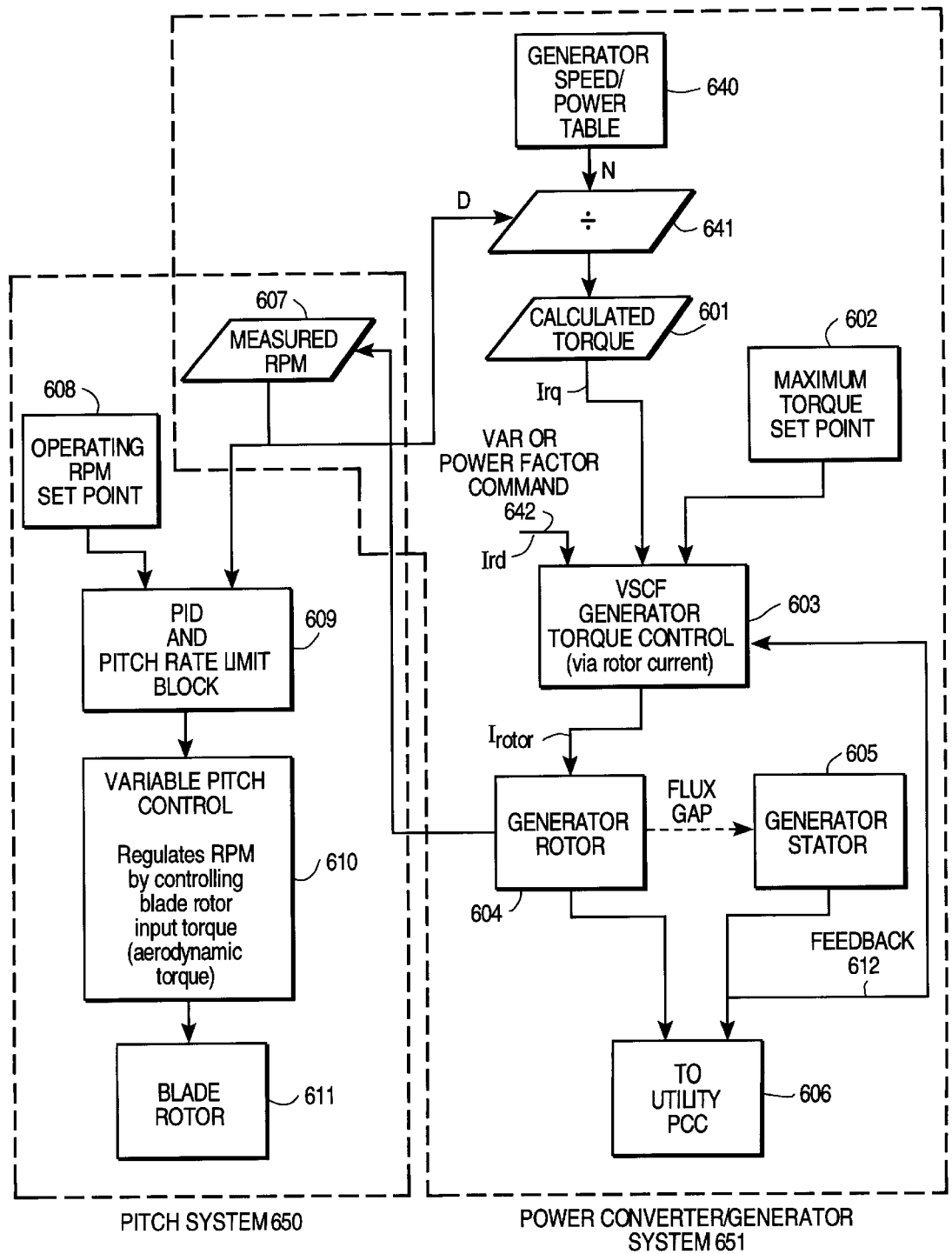
FIG_6A

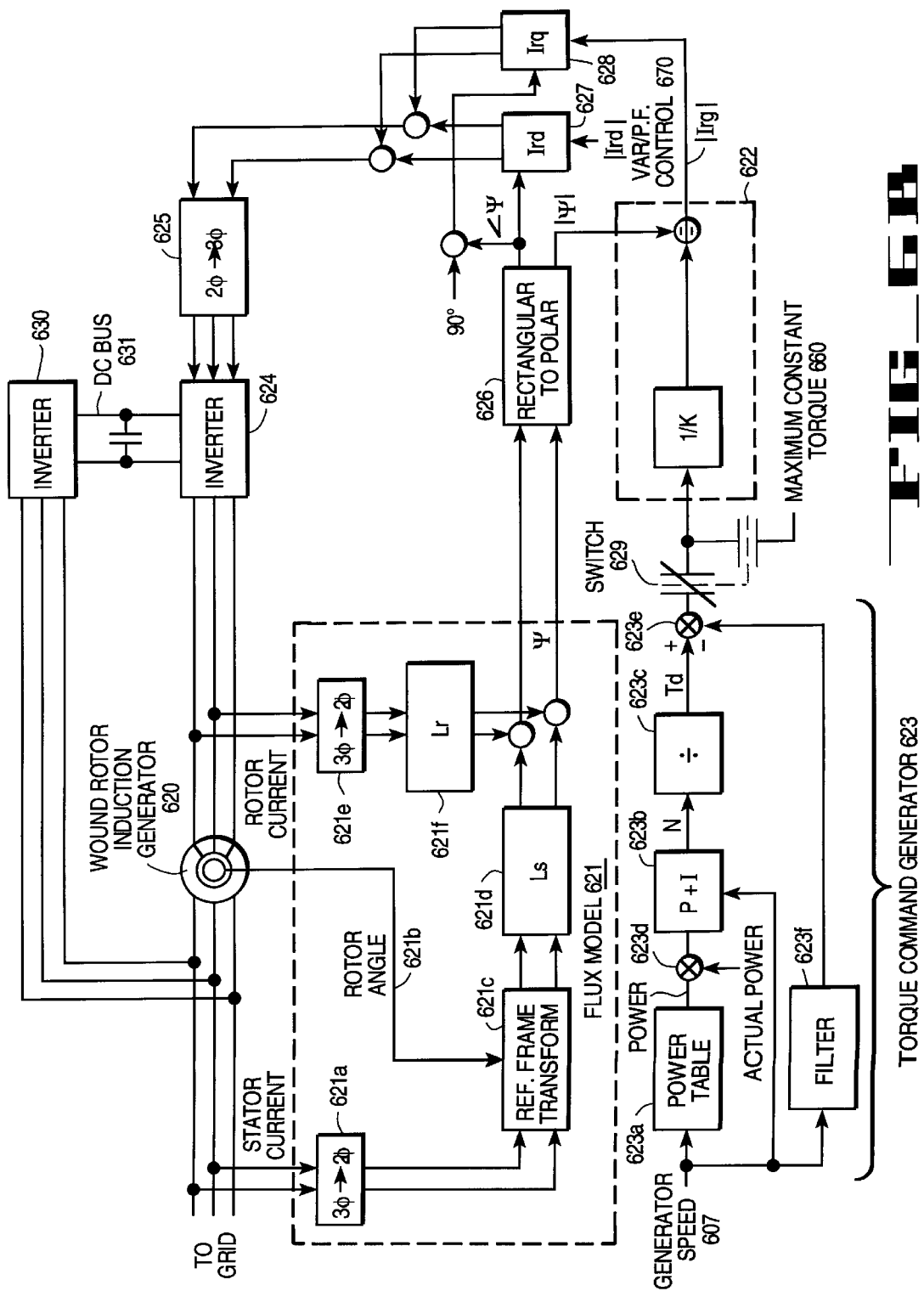
FIG_6B

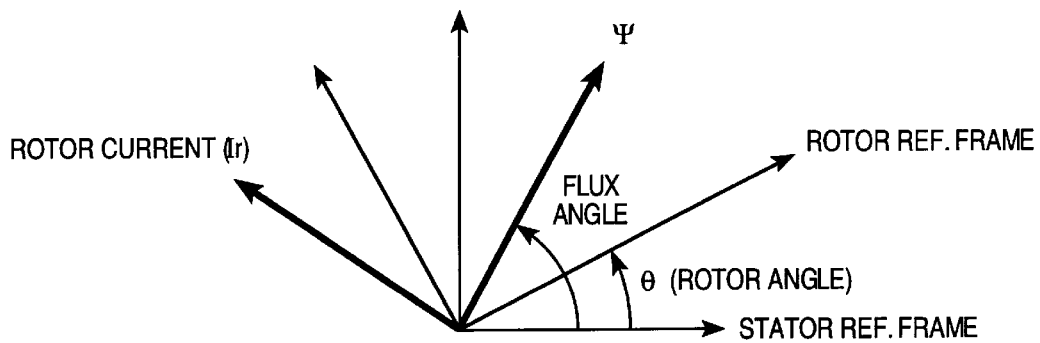
FIG_6C
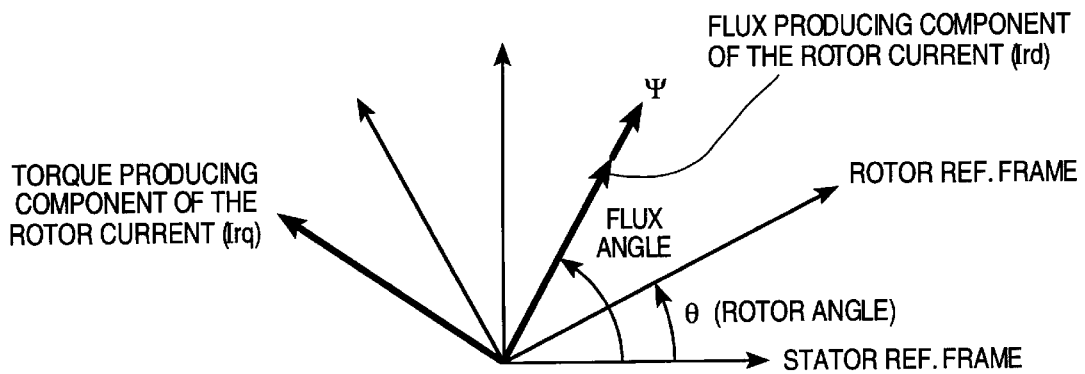
FIG_6D

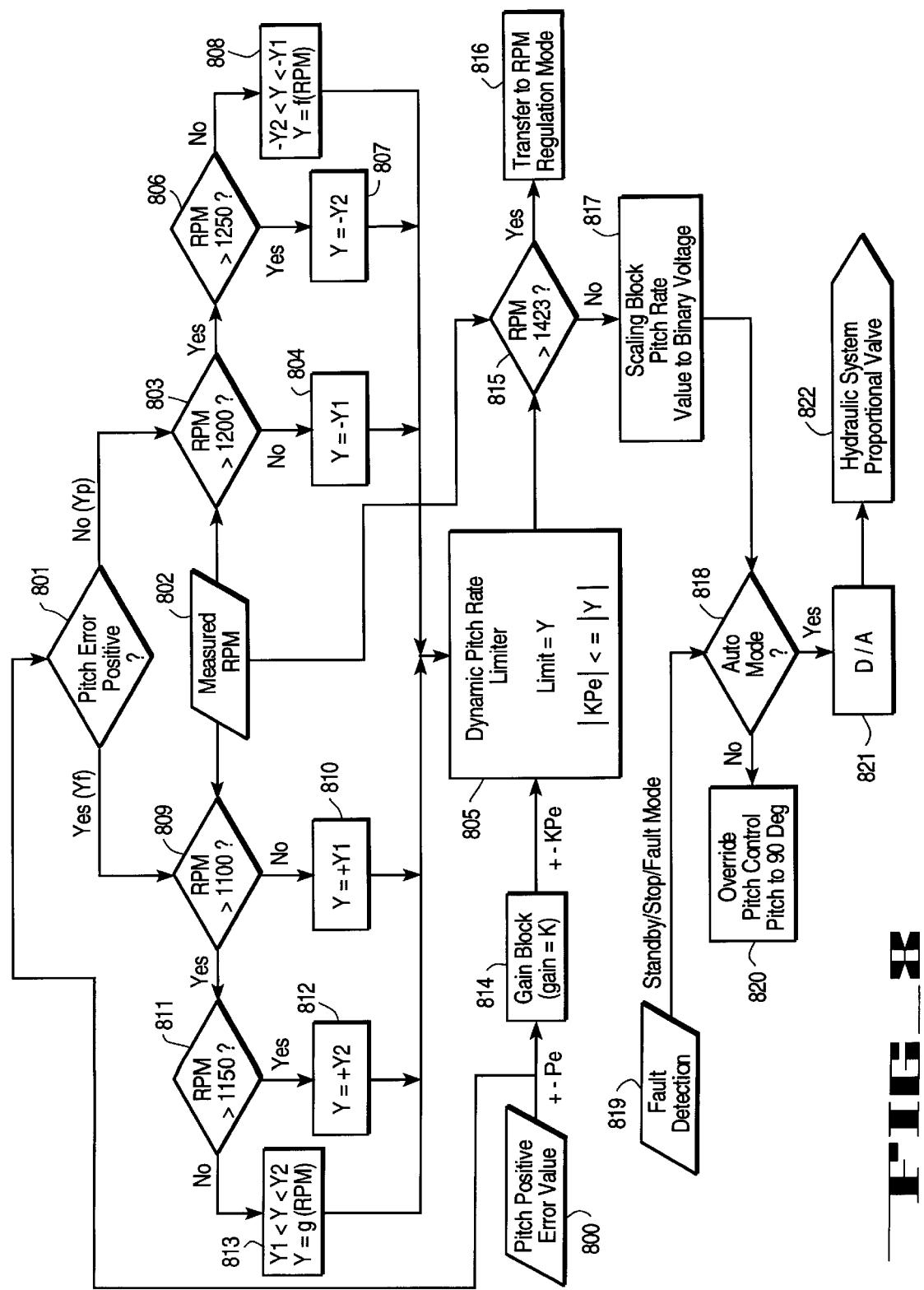
FIG._8

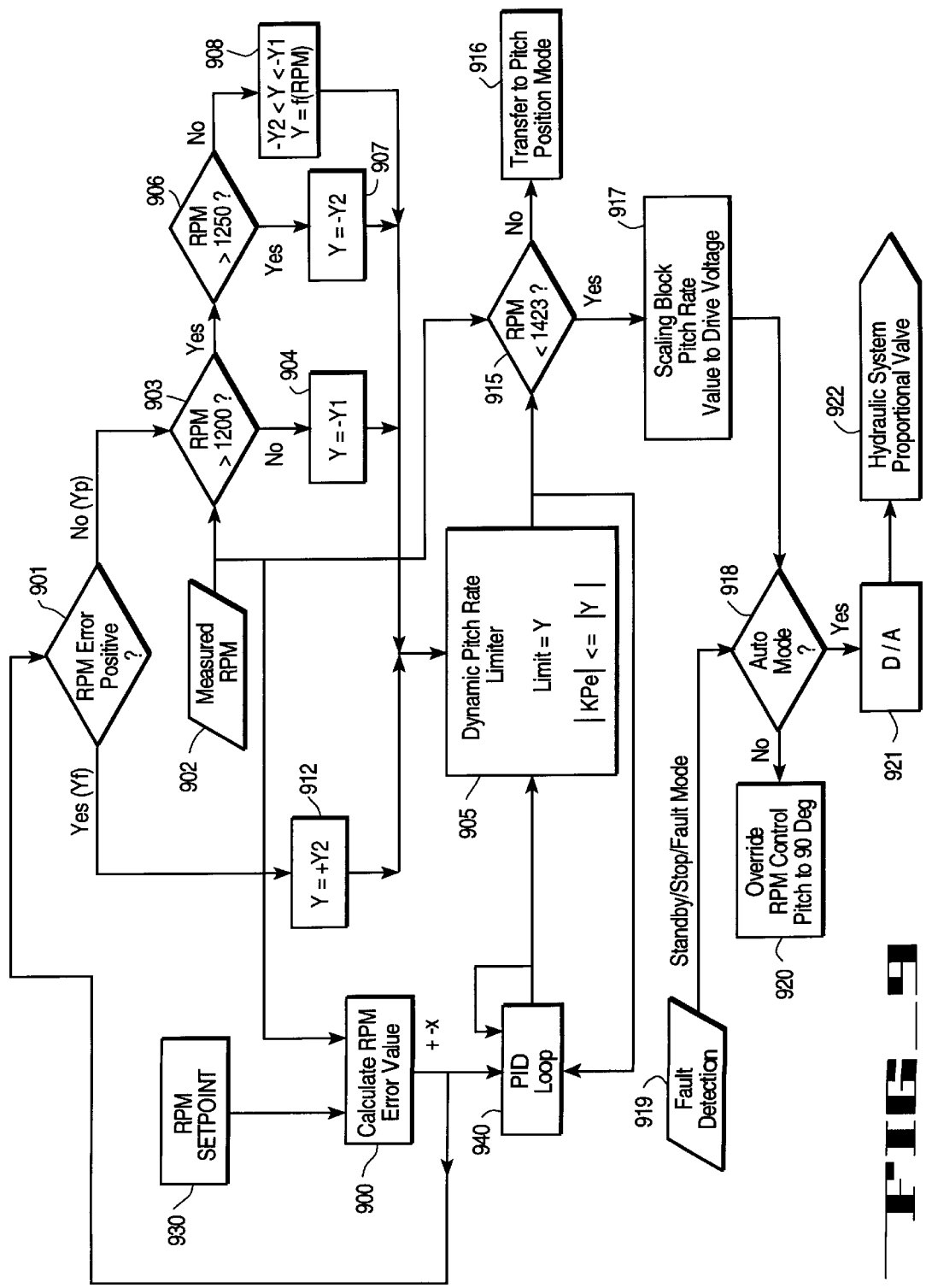
FIG.—9

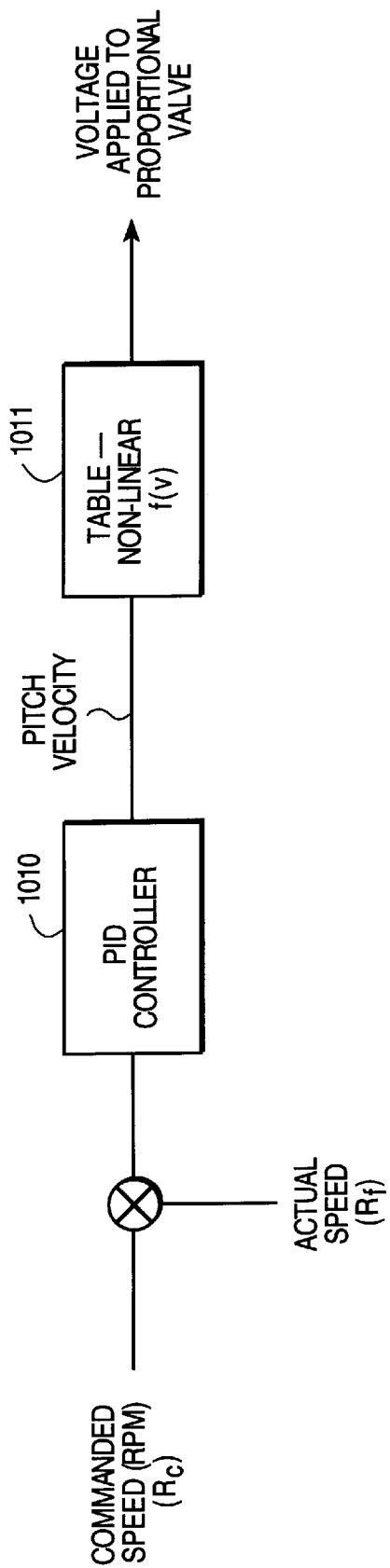
FIG_10A

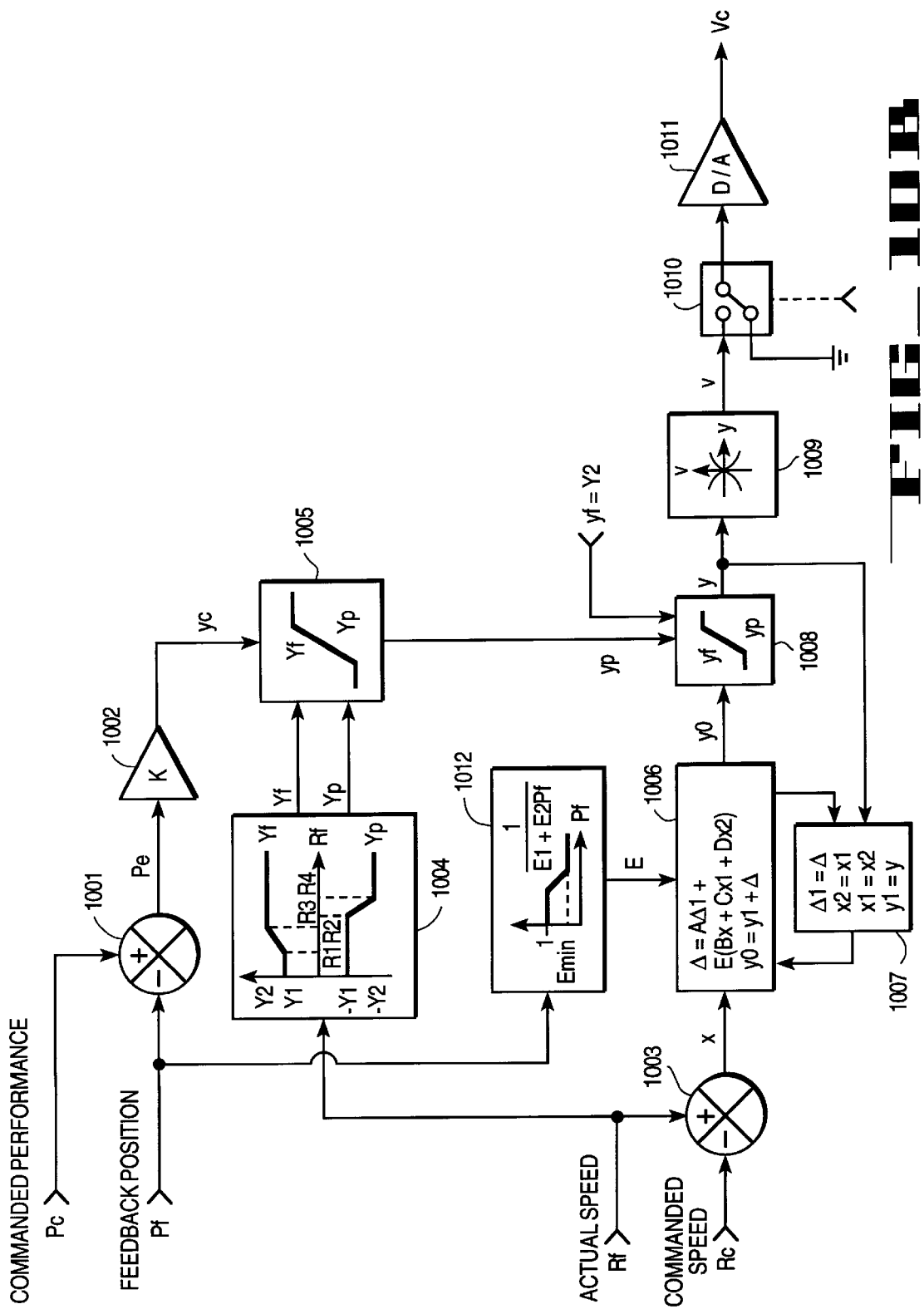
FIG._10B

VARIABLE SPEED WIND TURBINE GENERATOR

FIELD OF THE INVENTION

The present invention relates to the field of wind turbines; more particularly, the present invention relates to variable speed wind turbines having a doubly fed generator and applying torque control and pitch regulation based on generator rotor speed.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted within a housing, which is positioned on top of a truss or tubular tower. The turbine's blades transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid.

Many types of generators have been used in wind turbines.

At least one prior art wind turbine has included a doubly-fed wound rotor generator. See U.S. Pat. No. 4,994,684, entitled "Doubly Fed Generator Variable Speed Generation Control System," issued Feb. 19, 1991.

A wound rotor induction generator (WRIG) typically includes four major parts: the stator, the rotor, slip rings, and the end caps with bearings. A cross-sectional view of a two-pole 3-phase generator is shown in FIG. 1 where, for simplicity, the windings are shown as a pair of conductors. Referring to FIG. 1, generator 100 comprises stator 101, rotor 102, and winding phase A for each of the rotor and stator, 103 and 104 respectively. A shaft 105 that couples the blades of the wind turbine through the gear box to generator 100 is also shown.

Referring to FIG. 2, in a WRIG system, stator winding 104 is typically connected to the 3-phase utility power grid, such as 480V, 3-phase grid 201, and the rotor winding 103 is connected to a generator-side inverter 202 via slip rings (not shown). The winding 104 is also coupled to the 480V, 3 phase source 201 in parallel with a line-side inverter 203. The line-side inverter 203 and generator-side inverter 202 are coupled together by DC bus 204. The configuration shown in FIG. 2 (i.e., line-side inverter 203, DC bus 204, and generator-side inverter 202) allows power flow into or out of the rotor winding 103. Both inverters are under the control of a digital signal processor (DSP) 205.

Many conventional wind turbines rotate at a constant speed to produce electricity at a constant frequency, e.g., sixty cycles per second (60 Hz), which is a U.S. standard for alternating current or at 50 Hz which is a European standard. Because wind speeds change continuously, these wind turbines utilize either active (pitch regulation) or passive (stall regulation) aerodynamic control in combination with the characteristics of conventional squirrel cage induction generators for maintaining a constant turbine rotor speed.

Some turbines operate at variable speed by using a power converter to adjust their output. As the speed of the turbine rotor fluctuates, the frequency of the alternating current flowing from the generator also varies. The power converter, positioned between the generator and the grid, transforms the variable-frequency alternating current to direct current, and then converts it back to alternating current having a constant frequency. The total power output of the generator is combined by the converter (total conversion). For an example of such a turbine, see U.S. Pat. No. 5,083,039, entitled "Variable Speed Wind Turbine", issued Jan. 21, 1992.

Using variable speed wind turbines to generate electrical power has many advantages that include higher propeller efficiency than constant speed wind turbines, control of reactive power—VARs and power factor, and mitigation of loads.

Some prior art variable speed wind turbines are total conversion systems that use a power converter to completely rectify the entire power output of the wind turbine. That is, the wind turbine, operating at a variable frequency, generates a variable frequency output and converts it into a fixed frequency for tracking the grid. Such systems that utilize total conversion are very costly. Because of the cost, parties are often seeking lower cost solutions, such as for example, a wound rotor generator system utilizing partial conversion in which only a portion of the wind turbine output is rectified and inverted by the power converter.

Some problems currently exist with various control algorithms used by the power converters to control the partial conversion process. For instance, certain systems have stability problems in that they have large oscillations in power and torque. Other systems cannot produce enough power without overheating critical components or are not easily refined to provide a cost effective solution for series production.

Thus, a need exists for a low cost wind turbine system that does not have the stability problems of the prior art, yet still produces a large amount of power, cost effectively, without generating excessive amounts of heat and can be easily refined into a cost effective, readily producible design.

SUMMARY OF THE INVENTION

A variable speed system for use in systems, such as, for example, wind turbines, is described. The system comprises a wound rotor induction generator, a torque controller and a pitch controller. The torque controller controls generator torque using a field orientation control approach. The pitch controller performs pitch regulation based on generator rotor speed which is independent of the torque controller.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a cross sectional view of a simplified wound rotor induction generator.

FIG. 2 illustrates a typical system configuration incorporating a wound rotor induction generator.

FIG. 3 illustrates the equality relationship between torque and the cross product of current and flux.

FIG. 4 illustrates a wound field DC motor.

FIG. 5 illustrates flux direction when only "A" phase is energized.

FIG. 6A is a flow diagram of one embodiment of the system of the present invention.

FIG. 6B is a block diagram of one embodiment of the wound rotor induction generator and torque control of the present invention.

FIG. 6C illustrates the relation between flux vector and rotor current vector.

FIG. 6D illustrates components of the rotor current.

FIG. 8 is a flow diagram of one embodiment of the pitch regulation mode of the present invention.

FIG. 9 is a flow diagram of one embodiment of the rpm regulation mode of the present invention.

FIG. 10A is a block diagram of one embodiment of a pitch control system.

FIG. 10B is a block diagram of one embodiment of the proportional, integral, derivative (PID) pitch controller of the present invention.

DETAILED DESCRIPTION OF THE PRESENT INVENTION

Figure 7:
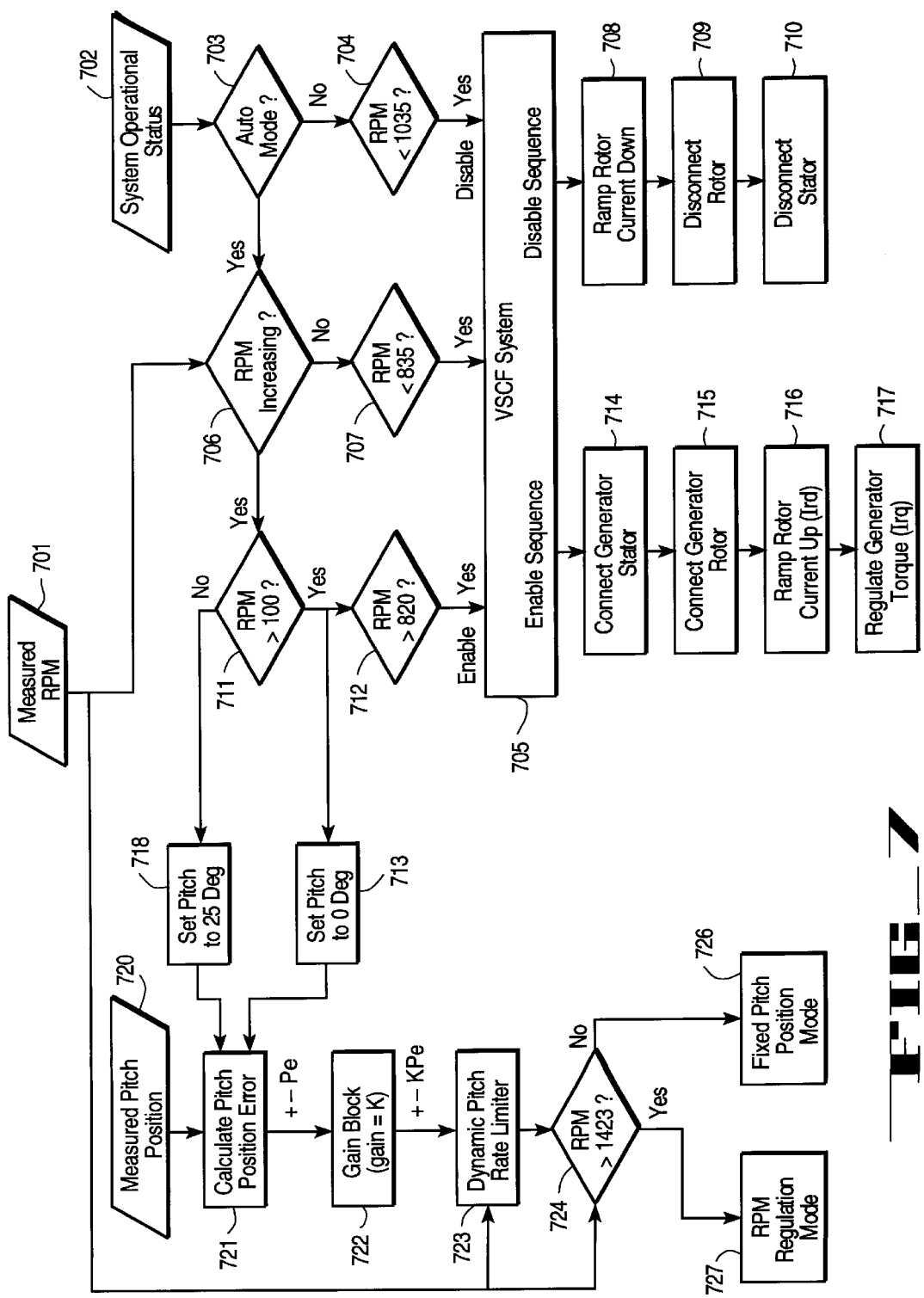
FIG. 7 is a flow diagram of one embodiment of the wind turbine controller of the present invention illustrating the enable/disable sequence for the power/torque controller and the different modes of the pitch controller.

A variable speed system is described. In the following description, numerous details are set forth, such as set points, numbers of watts, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

The present invention provides a variable speed system. In one embodiment, the variable speed system comprises a wind turbine generator with power/torque capability, which is coupled to and supplies generated power to a grid. In one embodiment, the generator of the present invention comprises a wound rotor induction generator (WRIG or doubly fed generator (DFG)) and a rotor that utilizes blade pitch regulation and variable speed operation to achieve optimum power output at all wind speeds.

An induction generator's ability to generate power is equivalent to its ability to produce torque at rotational speeds. When a torque is exerted on the generator's rotor in the opposite direction of its rotation, the mechanical energy of the rotor is converted to electrical energy. In an induction generator, torque is derived from the interaction between current and flux as illustrated in FIG. 3 or, more precisely, torque is the cross product of current and flux. To obtain maximum torque for a given flux level, the direction of the rotor current vector is kept exactly at 90 degrees from the direction of the flux. In a DC motor, this perpendicular relationship between flux and armature current is accomplished by commutators.

FIG. 4 shows the mechanical structure of a wound field DC motor. Because of the separate armature and field windings, a DC motor can be controlled by regulating the armature current for a desired torque output and by regulating the field winding current for the desired flux intensity.

Torque generation in an induction generator operates on the same principle as in a DC motor. The main difference between the two is that, in a DC motor, both the flux and armature current direction are fixed, while in a induction generator, these two vectors are constantly rotating.

Field oriented control (FOC) is an algorithm that identifies the flux vector and controls the torque production current accordingly.

FIG. 5 shows the flux direction when only stator winding phase A is energized. In the system shown in FIG. 2, stator phases are energized sequentially by a 3-phase voltage source and this creates a rotating flux vector.

Note that both flux and the 3-phase current are two-dimensional (2D) vectors (i.e., with a magnitude and an angle), and with zero rotor current, flux vector ($\psi$) is related to stator current vector (Is) by the following algebraic equation:

$$\psi = Ls * Is \tag{1}$$

where Ls is the stator inductance. Without the rotor winding being energized, the generator behaves like an inductor, i.e. the stator current lags stator voltage by 90 degrees or, more precisely, $$Vs = \frac{d}{dt}\psi = Ls\frac{d\,Is}{dt} \tag{2}$$

where Vs represents the stator voltage.

An important element in the FOC is the flux model. The flux model is used to identify the flux vector. Equation (1) is a very simple form of flux model for a WRIG and indicates that the flux vector can be simply identified by taking the product of stator current measurement (Is) and the stator inductance (Ls). By using the flux model, the flux vector may be identified so that torque may be controlled to generate power.

Although the following discussion describes the present invention in terms of a variable wind speed turbine, the present invention has application to other electrical and mechanical systems. For instance, the generator of the present invention may be used in systems that have other sources that rotate a shaft coupled to the generator rotor, such as hydroelectric, gas turbine, and general prime mover systems, etc.

In one embodiment, the wind turbine of the present invention comprises a rotor which is 3-bladed and comprises blades with full span blade pitch control, pitch bearings, and a hub. Such a wind turbine rotor is well-known in the art. Note that any number of blades or any turbine configuration may be used in the present invention. The wind turbine rotor is coupled to an integrated drive train that includes a main shaft. The main shaft is coupled to the generator.

The system of the present invention also comprises a power converter in the excitation circuit between the grid and the wound rotor of the doubly fed wound rotor induction generator. The stator is coupled, via a contactor, to the grid. Since the converter is in the rotor circuit, it processes (e.g., converts) a fraction of the total rated kilowatt (KW) output of the turbine rotor. In one embodiment, the total rated output of the turbine rotor comprises 750 KW, and the converter converts at most 25–30 percent of the total rated power (e.g., 160 KW). In one embodiment, the generator comprises a 750 KW, 460 volt, wound rotor induction generator.

In one embodiment, the present invention provides a variable speed system having a wound rotor induction generator, a torque controller, and a proportional, integral derivative (PID) pitch (or speed) controller. The induction generator of the present invention may comprise a slip ring or non-slip ring induction generator. The variable speed system uses the wound rotor induction generator with a power converter system to ensure the delivery of constant frequency power to the grid. Note that although grid applications are described, it would be apparent to one skilled in the art that the present invention may also be applied to other applications such as stand-alone power systems.

The torque controller, which is typically part of a power converter, controls the torque of the generator. In one embodiment, the torque controller controls generator torque as a function of generator speed with a field oriented control (FOC) approach using flux vector control. The torque controller operates on the generator from cut-in to rated wind speeds. In one embodiment, cut-in refers to the lowest wind speed at which the generator or turbine is designed to operate, while rated speed is the minimum wind speed at which the turbine produces its maximum power (e.g., 750 kw). In one embodiment, at above rated wind speeds, the torque controller holds the generator rotor at a constant power.

In one embodiment, the power controller comprises a look up table (LUT) that outputs power values as a function of generator rotor speeds. The power controller interpolates the LUT, which contains an encoded power-speed curve, to obtain a target output power. This power is then divided by the measured generator rotor speed to obtain a desired generator torque from the equation $T=P/\omega$ (torque =power/angular velocity). In one embodiment, the output of the LUT is a target output power, which is compared to the actual output power, using comparator or differencing hardware or software, to generate a power error indication. A proportional, integral (PI) controller generates an adjusted actual output power value in response to the power error indication, which when divided by the measured generator rotor speed, by divider hardware or software, results in a commanded torque. The commanded torque causes a specified rotor current vector to be impressed onto the rotor, which interacts with an identified flux vector to produce a desired generator torque.

Thus, the present invention also provides for controlling generator torque by measuring actual generator rotor speed, accessing a LUT using measured rotor speed to obtain a target output power, comparing actual output power to the target output power, and generating a commanded torque by adjusting a torque calculation to maintain a predetermined output based on the comparison of actual output power to the target output power.

In one embodiment, a process for synchronizing such a variable speed system is used that includes connecting a generator stator, connecting a generator rotor, ramping up a rotor current magnetizing current Ird (torque producing component of the rotor current) and regulating generator torque by controlling the flux producing component of the rotor current Irq.

The system of the present invention also includes a variable pitch and speed regulation subsystem which provides real-time proportional pitch position, as well as turbine speed regulation, by using a proportional, integral, derivative (PID) controller.

The PID controller performs pitch regulation based on generator rotor speed and operates independently of the torque controller in the power converter. In one embodiment, the PID controller is a closed loop PID controller that generates a pitch velocity to perform pitch regulation while at or above rated wind speeds. In one embodiment, the PID controller may begin to perform pitch regulation during less than above rated wind speeds. In one embodiment, below rated speed, the pitch angle is fixed at full power-on position.

The PID controller controls generator rotor speed by pitching the blades of a wind turbine. In one embodiment, the PID controller generates an output voltage in response to a difference between the target rotor speed and the measured (or actual) rotor speed, which a non-linear LUT (in one embodiment, table 1011 of FIG. 10) uses to output a pitch velocity in response thereto.

Although the present invention is described in conjunction with a PID controller, a proportional, integral (PI) controller, a proportional, derivative (PD) controller, or a proportional controller may be used in embodiments. Other lead-lag or lag-lead controllers can also be used. Also, although the present invention is described in conjunction with a closed loop controller, an open loop controller may be used, such as an open loop controller with a derivative term. These types of controllers are well-known in the art.

System Overview

FIG. 6A illustrates one embodiment of a system according to the present invention. Referring to FIG. 6A, a generator torque control 603 in a variable speed converter is coupled to receive a calculated torque 601 based on measured rpm 607 and a preselected maximum torque set point 602. In one embodiment, calculated torque 601 is a function of measured rpm of the generator based on look up table/power-speed curve 640.

The output of table 640 is divided by the measured rpm 607 using divider 641.

In one embodiment, the maximum torque 602 is set at approximately 5250 Nm and its selection is based on maximum current available from converter system thermal ratings. In other words, the selection is based on a calculated torque speed characteristic curve for a particular turbine rotor design. In one embodiment, this selection is based on an excitation amount of 290 amps.

In response to these inputs, torque control 603 generates a torque command to control the generator rotor 604. Torque control 603 is also coupled to receive a VAR or power factor command 642.

Generator rotor 604 is coupled to receive the torque command from generator torque control 603 and is coupled to provide power via a flux gap to generator stator output 605. A feedback 612 is coupled from generator stator output 605 to the input of generator rotor 604. The outputs of generator rotor 604 and generator stator 605 are coupled to utility grid 606.

Generator rotor 604 is also coupled to a measuring device which produces a measured speed 607 (in rpm) of generator rotor 604. In one embodiment, the measuring device comprises an optical encoder that provides position as well as rotational speed of generator rotor 604.

A proportional, integral, derivative (PID) controller and pitch rate limit block 609 is coupled to receive the measured speed 607 and an operating speed (rpm) set point 608. The operating speed set point may be set based on the same torque speed characteristic used to establish the maximum torque setpoint. In one embodiment, the operating speed set point is based on maximum torque and power. In one embodiment, the operating speed set point 608 is 1423 rpm. In response to these inputs, the PID and pitch rate limit block 609 generates a voltage output.

A variable pitch control (VPC) 610 is coupled to receive the pitch velocity output from PID and pitch rate limit block 609. VPC 610 is coupled to blade rotor 611 to regulate the speed of generator rotor 604 by controlling the input aerodynamic torque of blade rotor 611 through blade pitch action. PID and pitch rate limit block 609 generates a desired pitch velocity which is converted to a voltage using a table, as described in more detail below. A variable voltage output is applied to a proportional value in a hydraulic system that pitches blades by actuating a pitch cylinder at variable rate.

Thus, the variable pitch control regulates the rpm by controlling aerodynamic torque.

The PID and pitch rate limit block 609 including the measured rpm 607 and the operating speed (rpm) set point 608, VPC 610 and the blade rotor 611 form blade pitch system 650, while the measured rpm 607 and the remaining portion of the system in FIG. 6A are part of power converter and generator system 651. Note that in one embodiment the measured rpm 607 is used simultaneously by the blade pitch system 650 and the power converter/generator system 651.

The Power Converter of the Present Invention

In the present invention, the power converter controls the wound rotor induction generator according to a predetermined power-speed curve. By following the predetermined power-speed curve, the variable speed system is able to operate the turbine at the maximum power coefficient (Cp) from cut-in to rated wind, speeds, which is referred to herein as Region II, thereby ensuring that maximum aerodynamic energy capture is achieved. It should be noted that the power-speed curve is related to a torque-speed curve since $P=T\omega$.

In one embodiment, the power-speed curve is encoded in the power converter in the form of a look-up table (LUT) of power and corresponding generator speeds. The LUT may reside in hardware or software. To control torque, the power converter measures generator rotor speed, interpolates the LUT to determine the target turbine output power, and calculates the desired generator torque from the relation $T=P/\omega$ using the generator rotor speed. In one embodiment, this torque is produced by determining the required current vector and, using well-known pulse width modulation techniques, produces this vector.

In one embodiment, due to slight differences between theoretical and actuality, the power converter of the present invention employs a closed loop PI controller which compares actual turbine power output to a target, or desired, output and makes small adjustments to the torque calculation to achieve and maintain a desired turbine output.

The torque controller of the power converter uses field oriented control (FOC) to produce generator torque as a function of generator rotor speed. Using the stator current, the rotor current and the rotor angle as inputs, the torque controller of the power converter identifies the flux vector and commands the required rotor current vector which, upon interaction with the stator flux vector, produces the desired generator torque. The rotor current is created by the appropriate switching of the converter insulated gate bipolar transistors (IGBTs) using well-known pulse width modulation (PWM) current regulation techniques, such as described in U.S. Pat. No. 5,083,039, entitled "Variable Speed Wind Turbine", issued in Jan. 21, 1992. In this manner, the power control system follows an aerodynamically optimized power/torque-speed profile.

Note that the look up table values containing the power/torque-speed profile are based on the aerodynamics of the particular wind turbine rotor and wind turbine rotor geometry. Therefore, the table values set may vary for different turbine rotors.

One embodiment of the torque controller and pertinent portions of the wound rotor induction generator are shown in FIG. 6B. Torque can be expressed as $$Td = k*\psi*Irq \quad (3)$$

where k is a generator parameter. From the controller point of view, equation (3) takes the following form.

$$Irq = Td/(k*\psi) \quad (4)$$

Equation (4) gives the magnitude of the rotor current for a given 'desired torque' Td, which is output from torque command controller 623.

Referring to FIG. 6B, the torque controller 623 comprises a power table 623A, PI controller 623B, divider 623C, switch 625 and comparators 623D and 623E, which may be implemented in hardware or software to generate difference values, and a feedforward dampening filter 623F. Power table 623A is a LUT coupled to receive the generator speed 607 and outputs a target power value corresponding to the generator speed 607. One embodiment of power table 623A is shown in Table 1 below.

TABLE 1

| Generator Speed RPM | Electrical Power (kW) |
| --- | --- |
| 750 | −177 |
| 800 | −177 |
| 850 | 135 |
| 900 | 167 |
| 950 | 203 |
| 1000 | 247 |
| 1050 | 287 |
| 1100 | 335 |
| 1150 | 388 |
| 1200 | 450 |
| 1250 | 507 |
| 1300 | 575 |
| 1350 | 647 |
| 1400 | 743 |
| 1450 | 750 |
| 1500 | 750 |
| 1550 | 750 |
| 1600 | 750 |

The target output power is compared by comparator 623D to generate a difference between the target output power and the actual output power. The resulting difference is input to PI controller 623B which adjusts the power as described herein. Divider 623C is coupled to receive the adjusted power from PI controller 623B and generator speed 607 to output a commanded torque.

The commanded torque may be adjusted by a torque value generated by feedforward dampening filter 623F. Dampening filter 623F detects oscillation motion (at resonance) of the non-rigid (compliant) shaft (not shown to avoid obscuring the invention) caused by its coupling between two separate inertias, one due to the gear box and generator and the other due to the blades of the turbine. In response to this detection, dampening filter 623F applies a negative torque to reduce the relative motion between the two inertias. In one embodiment, dampening filter 623F comprises a bandpass filter in which the passband is centered at the resonant frequency of the two inertias and the shaft.

The resulting commanded torque is impressed upon the wound rotor of the induction generator.

Switch 629 operates in response to a braking indication (e.g., signal(s)) to switch the commanded torque to a maximum constant torque 660, as described in more detail below.

For torque production operation, a rotor current component Irq is controlled to follow the perpendicular direction of the flux (see FIG. (6D)). The magnitude of Irq is given by the equation below.

$$Irq = Td/(k*\psi)$$

where k is a generator parameter. Note that rotor current, Ird, which is discussed in more detail below, creates the generator flux and does not contribute to torque production.

Rotor current component block 622 is coupled to receive the commanded torque and the scalar component of the flux vector from rectangular-to-polar coordinate transform block 626, which converts the flux vector from flux model 621 into polar coordinates. In response to these inputs, rotor current component block 622 generates the rotor current torque component, Irq.

Flux model 621 identifies the flux vector. To identify the flux vector, current converter blocks 621A and 621B obtain the stator current vector and the rotor current vector. Note that since the current vector can be determined from measuring two of the three phase current, only two current sensors (not shown) are required. The stator current vector with rotor angle 621B of generator 620 are input to frame transform block 627C. Frame transform block 627C transforms the stator current to a rotor fixed frame. From outputs of frame transform block 627C, the stator inductance Ls is determined at block 621D. From the rotor current vector, the rotor inductance Lr may be obtained at block 621F. The flux vector is generated from the stator inductance Ls and the rotor inductance Lr.

Once the flux vector is determined, the rotor current vector output from inverter 624 is "positioned" in the perpendicular direction of the flux so as to produce torque. Since rotor current is specified with respect to rotor assembly, the rotor current command depends on both flux angle and rotor angle. Specifically, the flux angle is first transformed into a rotor fixed reference frame and, in this frame of reference, the direction of the rotor current command is the direction that is perpendicular to the flux direction. This procedure is shown in FIG. 6C.

Using the rotor current component, Irq, in conjunction with the inductive portion of the output of transform block 626, a current reference is generated at the input of inverter 624. Also shown is inverter 630 coupled to inverter 624 via DC bus 631 and coupled to the stator side (line side) of generator 620.

When this rotor current is forced to flow through the rotor windings, the desired torque Td is developed and the power (Td*ω) is generated where ω is the rotor speed. This power is generated in the form of stator current that flows back into the grid. This 'power carrying' stator current is in-phase with the stator voltage.

When power is being produced by the generator, the flux model described in Equation (1) above is no longer valid since the stator current (Is) now consists of two components: flux producing component and the power carrying component. This power carrying component does not contribute to flux production because this current component has the same magnitude (after normalized by winding ratio) as the torque producing rotor current but in the opposite direction. In other words, flux produced by these two current vectors (i.e., power carrying stator current and torque producing rotor current) summed together is zero. To remove the power carrying component from the stator current measurement, the rotor current (Ir) is added to Equation 1 above, i.e., $$\psi = Ls*Is + Lr*Ir$$

where Lr is the rotor inductance. Ls and Lr differ by winding ratio.

Note that in the operation described above, while the power carrying stator current component is in phase with the stator voltage, the flux producing component lags stator voltage by 90°. This flux producing current component results in non-unity stator power factor. Since flux producing current inherently lags voltage by 90°, to achieve unity power factor on the stator side, the flux is produced by the rotor winding.

To produce flux by rotor winding, an additional component, Ird, of rotor current should be commanded. This additional component should be along the direction of flux as shown in FIG. 6D.

As the flux producing component of the rotor current (Ird) increases, the flux producing stator current decreases. This is due to the fact that the flux magnitude is kept constant by the constant stator voltage (from Equation 2 above). The flux producing component of the rotor current, Ird, can be controlled in such a way that the flux it produces induces the same voltage as the grid voltage. That is, the induce voltage is in phase and has the same magnitude as the grid voltage. In this case, the induced voltages counter-act the grid voltage and, hence, stator winding draws no stator current. This is the system unity power factor case.

Note that a VAR/power factor control 670 may be incorporated into the system to control VAR production. (The product of the stator voltage Vs and the stator current vector Is (when no torque is produced) represents the magnetizing VAR required by the generator.

Enable Turbine Operation

The power converter operates only when enabled. A turbine controller enables and disables the power converter as shown in FIG. 7, Block 705. Such a turbine controller may be implemented in hardware, software, or a combination of both, such as in computer or controller based systems. In one embodiment, the present invention uses binary logic voltage signal for enabling and disabling the power converter, which is referred to herein as the converter enable signal.

In one embodiment, when the turbine controller is in normal operation mode, referred to herein as auto mode, the turbine controller yaws the turbine into the wind and pitches the blades of the turbine to a full power position. The full power position would be well understood to those skilled in the art. Given sufficient wind, the blades begin to rotate and the generator speed accelerates. Once the generator speed reaches a preselected converter enable speed, the turbine controller sends the converter enable signal to the power converter. In one embodiment, the preselected converter enable speed comprises 820 rpm.

In response to receiving the converter enable signal, a converter startup sequence begins. In one embodiment, the system initially closes the AC line contactor (in inverter 630), which results in the line matrix (in inverter 630) being connected to the grid. A predetermined delay allows this contactor to close and any transients to settle. In one embodiment, this predetermined delay is a 1.5 second delay. One embodiment of the enable sequence is described in more detail in conjunction with FIG. 7, and blocks 714, 715, 716 and 717.

After the contactor is closed, a bus precharge cycle occurs to ensure that the bus is fully charged and to allow for regulating the instantaneous torque. In this case, the DC bus voltage is regulated to a predetermined number of volts. In one embodiment, the predetermined number of volts comprises 750 volts DC. Another delay may be used to ensure that the bus is precharged sufficiently to regulate properly. In one embodiment, this delay may be 5 seconds. In one embodiment, if the bus fails to regulate, a bus over/under voltage fault is generated and a converter fault is sent to the turbine controller.

When the generator speed reaches a preselected speed or above and the predetermined bus delay has expired (i.e. after fully charging the bus for 5 seconds), the stator contactor is closed (block 714), thereby energizing the stator windings and producing a rotating stator flux. The stator windings are only energized with voltage. Due to the inductance of the stator windings, the inrush current is very small, and in one embodiment, only 75% of the maximum operating current. In one embodiment, the preselected speed is 900 rpm. A delay may be used to allow the stator contactor to close and transients to settle. In one embodiment, the delay is 3 seconds.

When the generator speed reaches a preselected speed or above, and the rotor voltage is verified to be below a predetermined voltage peak, the rotor contactor is closed (block 715), connecting the generator matrix to the rotor of the wound rotor induction generator. In one embodiment, the preselected speed comprises 1000 rpm and the predetermined voltage peak is 318 volts. A delay may be used to allow the rotor contactor to close. In one embodiment, this delay is ½ second. Up to this time, the rotor side IGBTs (in inverter 624) are not switching. Since the rotor side IGBTs are not yet switching, there is no current flow, and there is no transients or power production. Because there is not real power (only reactive power), no torque spikes are generated.

The production of power begins with the gating of the rotor side IGBTs which creates the current vector (both magnitude and position) required to produce the desired torque. In one embodiment, the current vector is created in response to a command from a torque controller (e.g., processor). Initially, this torque is ramped up from 0 to the value specified by the optimal power/torque-speed curve. The ramp-up (block 716) eliminates power or torque excursions and allows the turbine to be brought on-line smoothly.

Note that the synchronization of the present invention is different than traditional "synchronization" process used in synchronous or squirrel induction machines; in the present invention, there is no inrush, transients or power oscillations associated with putting the turbine on-line.

Once synchronized, the power converter follows the power-speed curve described above (block 717) until disabled by the turbine controller.

It should be noted that the delays discussed above with respect to the converter startup sequence may be adjusted based on the components being used in the system and the environmental conditions existing at the turbine site. These adjustments may be made in software, hardware, or both.

In one embodiment, power into the turbine is provided by the wind. If the wind speed changes, the turbine input power changes. To compensate for changes in the input power, the present invention provides an update process for updating the generator torque. Since the generator torque is (instantaneously) fixed by the power converter, the generator speed increases in accordance with the power formula $P=T\omega$). The power converter, which continuously samples generator speed, recognizes that the speed has changed and identifies the new speed, and updates the desired power from the look-up table. The power converter determines a new torque from the desired power and, based on FOC, calculates a new current vector which is impressed upon the generator rotor. In one embodiment, the update process occurs every 33 milliseconds, or every 2 cycles for a line at 60 Hz, causing the turbine to smoothly and accurately follow the power-speed curve. Note that the update rate could be varied or could change dynamically during operation.

Below rated wind speed (e.g., Region II), the blades are kept at a preselected power capture angle, and the resulting generator/turbine speed is due to the commanded torque and wind power input. This assures that the power-speed curve has been correctly chosen. In one embodiment, the preselected power capture angle is the maximum power capture angle (e.g., 0, 1, or 2 degrees pitch). The number of degrees changes as a function of the wind speed.

Rated power occurs at a predetermined generator rotor speed. In one embodiment, the generator speed at which rated power occurs is 1423 rpm. Above rated wind speed, the generator rotor speed is controlled by the PID controller which pitches the blades in response to a generator rotor speed indication. Note that this indication may be in a variety of forms that include, but are not limited to, a signal or stored speed value(s) in a register. Importantly, the PID pitch controller works independently of the power converter. If the power converter fails, the PID controller maintains the generator speed (1423 rpm in one embodiment) by commanding greater blade pitch angles. By doing so, this system has a built-in fail safe operation.

For generator speeds equal to or greater than the generator speed at which rated power occurs (e.g., 1423 or more), the power-speed curve is such that the power converter holds power constant, and without significant fluctuations. Hence, above rated speed wind gusts, which tend to increase turbine speed, have little effect on generator power, as the PID controller responds and regulates generator rotor speed. The response of the PID controller, however, is such that it is able to effectively control rotor speed and thus power excursions to within approximately 5 percent, yielding a nearly flat power production for wind speeds equal to or greater than rated.

Above rated power excursions have no effect on grid voltage as excess power is developed by the rotor of the wound rotor induction generator since stator power remains constant. Rotor current (and stator current) is held constant during these excursions by the power converter by holding torque constant (torque being proportional to current). Since rotor current is constant during these gusts, the increase in rotor power is due to an increase in rotor voltage. But the grid is not affected by this voltage increase because the power converter, situated between the generator rotor and the grid, electronically translates this varying rotor voltage (and frequency) to a constant AC waveform (e.g., 60 cycle 460 volt AC waveform).

Full Span Variable Pitch Control System

The variable pitch control system (VPC) of the present invention is a real time, distributed, servo system for pitch position and rotor speed control of the wind turbine. The VPC monitors and controls blade pitch position, pitch velocity, and generator rotational speed.

In one embodiment, a pitch position transducer provides an analog signal that is proportional to the blade pitch position, and later converted to digital, to identify the current position of the turbine blades. A blade actuator coupled to the blades is used to mechanically change the pitch of the blades.

FIG. 7 is a flow diagram illustrating one embodiment of the pitch regulation system of the present invention. Control or processing logic in the system performs some of the operations in cooperation with the electrical/mechanical hardware in the system. The control/processing logic may be implemented in hardware, software, or a combination of both, such as in a computer or controller system.

Referring to FIG. 7, the pitch regulation system begins by measuring the rotor speed (block 701). At the same time, the system determines its operational status (block 702). A test determines whether the pitch regulation system is in auto mode (block 703). If the operation status of the system is not auto mode, a test determines if the generator rotor speed (in rpm) is less than a predetermined speed (block 704). In one embodiment, the predetermined speed is 1035 rpm. If system is not in auto mode and the generator rotor speed is less than the predetermined speed, the power converter is signaled to enter a disable sequence (processing block 705); otherwise, the system remains in its current state.

If the system is operating in auto mode, processing continues at block 706 where a test determines if the generator rotor speed is increasing. If the generator rotor speed is not increasing, a test determines if the generator rotor speed is less than a predetermined set point (block 707). In one embodiment, this predetermined set point is 835 rpm. If the generator rotor speed is not increasing and is less than 835 rpm, the power converter is signaled to enter a disable sequence (block 705); otherwise, the system remains in its current state.

In one embodiment, the disable sequence comprises ramping the rotor current down (block 708), disconnecting the rotor of the generator (block 709), and disconnecting the stator of the generator (block 710).

If the generator rotor speed is increasing as determined at block 706, a test determines whether the generator rotor speed is greater than 100 rpm (block 711). If the generator rotor speed is greater than 100 rpm, the pitch is set to a predetermined set point (processing block 713). In one embodiment, the predetermined set point is zero degrees. In other embodiments, the pitch may set to any number of degrees, or portions thereof, including one, two, or three degrees. In one embodiment, the predetermined set point is variable.

Also, if the generator rotor speed is greater than 100 rpm, a test determines whether the generator rotor speed is greater than a predetermined speed (block 712). In one embodiment, this predetermined speed is 820 rpm. If the generator rotor speed is greater than this predetermined speed, the converter is signaled to enter an enable sequence (processing block 705). Therefore, in this embodiment, the power converter is enabled when the generator rotor speed is greater than 820 rpm.

In one embodiment, the enable sequence comprises the following steps. First, the generator stator is connected to the grid (block 714). After connecting the generator stator, the generator rotor is connected (block 715). After connecting the generator rotor, the flux component of the generator rotor current, Ird, is ramped up (block 716) and then the generator torque is regulated (block 717). This enable sequence is a passive synchronization technique connecting the generator so as to come on-line with the rotor current at zero. This is possible with the vector control in cooperation with the wound rotor induction generator of the present invention.

If the test determines that the generator rotor speed is increasing but is not yet over 100 rpm (block 711), the pitch is set to a predetermined number of degrees (block 718). In one embodiment, the pitch is set to 25 degrees. Note that this pitch is a set point that may be varied. The pitch should be chosen to obtain extra lift to help speed up the turbine faster.

The present invention also performs the pitch position portion of the system. At first, the pitch position is measured, using well-known measuring device (block 720). After measuring the pitch position, the pitch position error between the actual pitch and a predetermined set pitch is calculated (block 721).

After calculating the pitch position error, the pitch position error is amplified (block 722). With the amplified pitch position error and the measured speed (block 701), the change in dynamic pitch rate is limited (block 723).

After limiting the dynamic pitch rate to a predetermined amount, a test determines whether the generator rotor speed is greater than a predetermined speed. In one embodiment, this set point is 1423 rpm. If the generator speed is not greater than the predetermined speed, the pitch regulation system enters the fixed pitch position mode (block 726); otherwise, the pitch regulation system enters the RPM regulation mode (block 727).

Pitch Regulation Mode

As discussed herein, pitch regulation refers to holding the blade pitch angle at the design operating position for operation below rated power. In one embodiment, this position is at 0 degrees. However, other positions may be employed. The VPC performs pitch regulation by commanding a negative voltage that causes the pitch cylinder to move from its initial stop (e.g., 90 degrees) or feathered position at a constant velocity of some number of degrees (e.g., 1.0) per second toward its nominal zero degree set point.

In the present invention, a position command voltage is applied to an error amplifier to produce an error output that is proportional to the difference between the command position (Pc) and the feedback position (Pf). In one embodiment, the error amplifier is software generated. However, such an amplification could be performed in hardware.

The output error is amplified and sent to the proportional valve. A position rate limiter is used to limit the pitch rate initially to one degree per second. This limits the acceleration of the rotor in both low and high winds and allows a smooth transition to generation without overspeed problems.

Once the turbine has reached its zero degree position, the proportional amplifier helps maintain this position by generating a voltage that is proportional to any error that would incur due to bleed down of the hydraulic system pressures. If, during initial pitching to the operating pitch angle, the generator speed does not exceed a predetermined speed (e.g., 100 rpm), then the system pitches the blades to a predetermined value (e.g., 25 degrees). This helps start the rotor turning in very light winds. Once the generator speed is above the predetermined speed, then the system pitches the blades to a nominal zero degree position.

Pitch regulation occurs at and above rated power (i.e., in Region II) when the speed of the generator speed is below its rated set point (e.g., 1423 rpm). In one embodiment, during transitions from below rated to above rated, the PID system begins to pitch the blades toward feather prior to the generator speed reaching the rated set point (e.g., 1423 rpm) depending upon the acceleration of the generator rotor speed signal (from, for instance, block 607).

Pitch regulation below rated power does not require a full PID system due to the change of the pitch velocity being limited to only one degree per second.

FIG. 8 illustrates one embodiment of the pitch position mode of the present invention. Referring to FIG. 8, the pitch position error value, which is proportional to the difference between the command position (Pc) and the feedback position (Pf), is calculated (block 800). Then a test determines whether the pitch error is positive (block 801). If the pitch error is not positive, then a test determines whether the rotor speed is greater than a first predetermined speed set point (block 803). In one embodiment, the predetermined speed set point is 1200 rpm as measured at block 802. If the pitch error is not positive and the generator rotor speed is not greater than the first predetermined speed set point, processing continues at block 804 where the pitch rate limit is set equal to −Y1 and is input to the dynamic pitch rate limiter 805.

If the rotor speed is greater than the first predetermined speed set point, then a test determines whether the rotor speed is greater than a second higher predetermined speed set point (block 806). In one embodiment, the second predetermined speed set point is 1250 rpm. If the rotor speed is greater than the second predetermined speed set point, then processing continues at block 807 where the pitch rate value Y is set to −Y2 and is input to the dynamic pitch rate limiter 805. If the rotor speed is not greater than second predetermined speed set point, then the pitch rate limit value Y is set to a function of the rotor speed (block 808), which is between −Y1 and −Y2, and the pitch rate limit value Y is sent to the dynamic pitch rate limiter (block 805). In one embodiment, this function is a linear function of the pitch rate limiter that ramps between a minimum and a maximum.

If the pitch error is positive, then a test determines whether the rotor speed is greater than a third predetermined speed set point (block 809). In one embodiment, the third predetermined speed set point is 1100 rpm. If the pitch error is positive and the generator rotor speed is not greater than the third predetermined speed set point, processing continues at block 810 where the pitch rate limit Y is set equal to Y1 and is input to the dynamic pitch rate limiter (block 805).

If the rotor speed is greater than the third predetermined speed set point, then a test determines whether the rotor speed is greater than a fourth predetermined speed set point (block 811). In one embodiment, the fourth predetermined speed set point is 1150 rpm. If the rotor speed is greater than the fourth predetermined speed set point, then processing continues at block 812 where the pitch rate limit value Y is set to Y2 and is input to the dynamic pitch rate limiter (block 805). If the rotor speed is not greater than the fourth predetermined speed set point, then the pitch rate limit value Y is set to a function of the rotor speed (block 813), which is between Y1 and Y2, and the pitch rate limit value Y is sent to the dynamic pitch rate limiter (block 805). Thus, the function is in the opposite direction of the function of block 808 described above. In one embodiment, this function is a linear function of the pitch rate limiter that ramps between $Y_1$ and $Y_2$, a maximum and a minimum, respectively.

The pitch position error value determined at block 800 is amplified (block 814) and input to the dynamic pitch rate limiter (block 805). In response to the pitch rate limit value Y and the amplified pitch position error value, the pitch rate change is limited initially to one degree per second to limit acceleration of the rotor in both low and high winds and to allow a smooth transition to generation without over speed problems.

A test determines whether the measured rotor speed from block 802 is greater than a fifth predetermined speed set point (block 815). In one embodiment, the fifth predetermined speed set point is 1423 rpm. If the measured rotor speed is greater than the fifth predetermined speed set point, the system enters the RPM regulation mode (block 816). On the other hand, if the measured rotor speed is not greater than the fifth predetermined speed set point, then the pitch rate is set to a programmed value (block 817), which may be represented as a binary voltage, and processing continues at block 818.

At block 818, a test determines whether the system is in auto mode. In one embodiment, this test is determined by examining whether the system is in stand by/stop fault mode as a result of a fault being detected at block 819. If the system is not in auto mode, processing continues at block 820 where the pitch control is overridden to turn off the system. In one embodiment, the system is turned off by pitching the blades to 90°. If the system is in auto mode, then the binary voltage representing the programmed values is converted to analog (block 821) and drives a hydraulic system proportional valve (block 822).

In one embodiment, a single digital-to-analog converter (D/A) generates the voltage required by the hydraulic pro-
portional valve. This voltage is directly proportional to the velocity of the hydraulic pitch cylinder, i.e., the rate of change of blade pitch position. In one embodiment, a positive voltage causes the blades to pitch toward the feather direction (pitch to feather), while a negative voltage causes the blades to pitch toward the power direction (pitch to power). The pitch rate is controlled by the amplitude of the D/A output voltage. In one embodiment, an output sample rate of the D/A is fixed at 10 Hz.

RPM Regulation Mode

The VPC system regulates generator speed. In one embodiment, generator speed is regulated by a Proportional, Integral and Derivative (PID) control of the turbine blade pitch angle. The VPC system calculates and then later amplifies an error, via software in one embodiment, to produce an output error that is proportional to the difference between the commanded speed (e.g., 1423 rpm), which is referred to herein as Rc, and the feedback speed, referred to herein as Rf. The present invention uses this output to generate PID values required for correct velocity control of the proportional valve and, hence, the blade pitch angle.

When the rotor speed nears a predetermined set point (e.g., 1423 rpm), the PID controller generates a voltage that pitches the blades toward feather. Conversely, when the rotor speed drops, below the predetermined set point (e.g., 1423 rpm), the PID controller generates a voltage that pitches the blades toward power until again reaching the nominal pitch setting or exceeding the nominal predetermined set point (e.g., 1423 rpm).

The PID speed regulation controller is a velocity based system. In one embodiment, a table is used to change the pitch rate values generated by the PID control logic into specific voltages to be applied to the proportional value. An example table is shown in Table 2. In one embodiment, the maximum pitch to feather velocity is 12 degrees per second while the maximum pitch to power velocity (during speed regulation) is 8 degrees per second. These correspond to output D/A voltages of 5.1 and 4.1 respectively.

TABLE 2

Pitch Rate to Drive Voltage Translation Table

| VOLTAGE | RATE deg/sec |
|---|---|
| −8.25 | −20 |
| −7.90 | −19 |
| −7.55 | −18 |
| −7.20 | −17 |
| −6.85 | −16 |
| −6.50 | −15 |
| −6.15 | −14 |
| −5.80 | −13 |
| −5.45 | −12 |
| −5.10 | −11 |
| −4.75 | −10 |
| −4.40 | −09 |
| −4.05 | −08 |
| −3.41 | −07 |
| −3.12 | −06 |
| −2.88 | −05 |
| −2.67 | −04 |
| −2.34 | −03 |
| 01.96 | −02 |
| −1.45 | −01 |
| 0.00 | 00 |
| 1.83 | 01 |
| 2.33 | 02 |
| 2.71 | 03 |
| 3.12 | 04 |
| 3.46 | 05 |

TABLE 2-continued

Pitch Rate to Drive Voltage Translation Table

| VOLTAGE | RATE deg/sec |
|---|---|
| 3.79 | 06 |
| 4.08 | 07 |
| 4.25 | 08 |
| 4.45 | 09 |
| 4.65 | 10 |
| 4.85 | 11 |
| 5.05 | 12 |
| 5.25 | 13 |
| 5.45 | 14 |
| 5.65 | 15 |
| 5.85 | 16 |
| 6.05 | 17 |
| 6.25 | 18 |
| 6.45 | 19 |
| 6.65 | 20 |

Note that in Table 2, a negative pitch rate is a pitch to power, while a zero or position pitch rate is a pitch to feather.

In one embodiment, a valve control switch turns off the proportional valve during Stop and Standby modes as commanded.

FIG. 9 illustrates one embodiment of the rpm regulation mode of the present invention. Referring to FIG. 9, at block 900, the speed error value that is proportional to the difference between the commanded rpm (Pc) from (block 930) and the measured rpm (Pf) from block 902 is calculated (block 900).

A test determines whether the rpm error is positive (block 901). If the speed error is not positive, then a test determines whether the rotor speed is greater than a first predetermined speed set point (block 903). In one embodiment, the predetermined speed set point is 1200 rpm. If the rpm error is not positive and the generator rotor speed is not greater than the first predetermined speed set point, processing continues at block 904 where the pitch rate limit value is set equal to −Y1 and is sent to the dynamic pitch rate limiter 905.

If the rotor speed is greater than the first predetermined speed set point, then a test determines whether the rotor speed is greater than a second higher predetermined speed set point (block 906). In one embodiment, the second predetermined speed set point is 1250 rpm. If the rotor speed is greater than the second predetermined speed set point, then processing continues at block 907 where the pitch rate limit value Y is set to −Y2 and is input to the dynamic pitch rate limiter 905.

If the rotor speed is not greater than second predetermined speed set point, then the pitch rate limit value Y is set to a function of the rotor speed (block 908). In one embodiment, this function is a linear function of the pitch rate limiter that ramps between −Y1 and −Y2. The pitch rate value Y is sent to the dynamic pitch rate limiter (block 905).

If the speed error is positive, then the pitch rate limit value Y is set to Y2 (block 912) and is input to the dynamic pitch rate limiter (block 905).

Also after calculating the speed error value, the PID system determines if the acceleration is too fast and sets the pitch accordingly (block 940). In response to the pitch rate limit value Y and the output of the PID loop 940, the pitch rate is limited to initially to one degree per second (block 905).

Then a test determines whether the measured rotor speed (block 902) is greater than a third predetermined speed set point (block 915). In one embodiment, the third predetermined speed set point is 1423 rpm. If the measured rotor speed is less than the third predetermined speed set point, the system enters the pitch position mode (block 916). On the other hand, if the measured rotor speed is greater than the third predetermined speed set point, the pitch rate is converted using the pitch rate to drive voltage translation table described above (block 917), and processing continues at block 918.

At block 918, a test determines whether the system is in auto mode. In one embodiment, this test is determined by examining whether the system is in stand by/stop fault mode ;Is a result of a fault being detected at block 919. If the system is not in auto mode, processing continues at block 920 where the pitch control is overridden to turn off the system. In one embodiment, the system is turned off by pitching the blades to 90°. If the system is in auto mode, then the voltage representing the pitch rate value is converted to analog (block 921) and is applied to the hydraulic system proportional valve to initiate pitching action (block 922).

A Pitch System with a PID Controller

FIG. 11A illustrates one embodiment of one pitch system. Referring to FIG. 11A, the pitch system comprises a closed loop PID controller 1010 and a non-linear table 1011 for converting pitch velocity inputs to voltage outputs. The pitch velocity values received by table 1011 are generated by PID controller 1010 in response to a difference in output speed and commanded speed, as determined by comparison logic or software. The voltage outputs from table 1011 are applied to a proportional value, which results in blade pitch action.

A block diagram of the functional flow of one embodiment of the PID controller is shown in FIG. 10B. Referring to FIG. 10B, a difference is determined between the position feedback value, Pf, from the position commanded, Pc by comparison logic (e.g., a subtractor) or software 1001. This difference represents the position error. The position error is amplified by a scale factor of K by amplifier 1002 to create the value yc. In one embodiment, K is set at 0.5. The value yc is coupled as an input to limiter 1005, which is controlled by limiter controller 1004. Limiter 1005 limits the pitch rate of the blades during pitch position movements. In one embodiment, the pitch rate is slow. Controller 1004 is coupled to receive the generator speed feedback and, in response thereto, changes the limiter 1005 based on the generator speed (in rpm). The limiter controller (block 1004) ramps maximum pitch to feather or pitch to power rate using a linear function of measured value of rpm, $R_F$.

The PID controller also comprises comparison logic (e.g., a subtractor) or software 1003 to generate a difference between the commanded generator speed, Rc, and the actual generator speed, Rf. The output of comparison block 1003 is the speed error value x, which is received by the PID algorithm blocks 1006 and 1007 The PID algorithm (blocks 1006 and 1007) compute a desired pitch rate based on a proportional, integral and derivative function of the speed error value. The pitch rate output as a function of speed error input may also include gain scheduling that adjusts gains as a function of pitch position. A gain rate scheduler (block 1012) provides the multiplier, E, based on pitch position feedback and two set point parameters E1 and E2. In one embodiment, the two set point parameters E1 and E2 are =−0.85 and 0.0028 respectively.

The output of the block 1005 is coupled to the output of 1006 and yf to feed into block 1008. Limiter 1005 limits the maximum pitch velocity of pitch to feather and pitch to power during speed regulation mode.

The output of limiter 1008 provides the input of a voltage generator 1009 and feeds back into PID algorithm block

1007. The output of voltage generator 1009 is coupled to the input of switch 1010 which is controlled to shut off the proportional value in response to a command to stop the turbine. The output of switch 1010 is coupled to a D/A converter 1011 that provides the voltage output for the system that is applied to the proportional value driving the blade pitch action.

Dynamic Braking

To achieve dynamic braking, the torque-speed curve of the present invention may be deliberately skewed. In one embodiment, the power converter commands a maximum constant torque. This maximum constant torque is switched into the system in response to a fault condition, causing the turbine speed to decrease. FIG. 6B illustrates the power converter including a maximum constant torque 660 and switch 629.

In one embodiment, the safety system initially applies a soft brake and pitches the blades to 90 degrees. Afterwards, a test determines whether there has been a fault. In one embodiment, dynamic braking is only used in response to hard stop faults. In other embodiments, dynamic braking may be used for other types of faults (e.g., soft, hard, etc.).

In response to determining that a hard stop fault occurred, the present invention pitches the blades to 90 degrees and commands the maximum constant torque value. The torque is impressed upon the generator rotor, resulting in a decrease in turbine speed. In one embodiment, the turbine is slowed to a predefined speed. After attaining the predefined speed, the braking may be released, either automatically or manually (e.g., manual reset by operator).

Power Factor and VAR Compensation

Since the power converter controls the rotor current directly, the total system power factor can be controlled and adjusted dynamically over a range of 0.90 lagging to 0.90 leading regardless of turbine output level. In the present invention, the VARs are supplied to the secondary of the induction generator. Thus, the power converter can act as a VAR compensator for the utility. This is accomplished by a control system which commands a specific number of KVARs from each turbine through a SCADA system. FIG. 6B illustrates an input 670 to control the VARs. By adjusting the supply of VARs to the secondary, total system VARs can be selected dynamically.

The desired power factor can be set at any nominal value between 0.90 lagging and 0.90 leading or vary in response to fluctuations in grid voltage. Hence, the power converter, working through SCADA can operate in a constant power factor mode, constant VAR mode, or a voltage regulating mode.

Some of the benefits of the power conditioning of the present invention is that it provides maximal energy capture, torque control, elimination of voltage flicker, as well as power factor control. In addition, dynamic power factor adjustment is available. Furthermore, the variable speed of the present invention provides for mitigating torque spikes. Torque transients, which cause voltage flicker and damage to the drive train components, are attenuated by allowing an increase in rotor speed, thereby "storing" the additional energy of a wind gust in a rotation inertia of the rotor blades. This energy can be extracted and fed into the grid by reducing the rotor speed as the wind gust dies or it can be "dumped" by pitching the blades out of the wind. Thus, variable speed operation can dramatically reduce torque transients which translates to lower cost and longer life for the wind turbine drive train.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed above, the present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnet or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiment are not intended to limit the scope of the claims which in themselves recite only those features regarded as essential to the invention.

Thus, a variable speed system has been described.

We claim:

1. A variable speed wind turbine system comprising:
a wound rotor induction generator;

a torque controller coupled to the generator to control generator torque using field oriented control; and a pitch controller coupled to the generator to perform pitch regulation based on generator rotor speed and operating independently of the torque controller.

2. The system defined in claim 1 wherein the pitch controller comprises a proportional, integral derivative (PID) pitch controller.

3. The system defined in claim 1 wherein the pitch controller comprises a proportional, integral (PI) pitch controller.

4. The system defined in claim 1 wherein the pitch controller comprises a proportional, derivative (PD) pitch controller.

5. The system defined in claim 1 wherein the pitch controller comprises a Lag-Lead controller.

6. The system defined in claim 1 wherein the pitch controller comprises a Lead-Lag controller.

7. The system defined in claim 1 where the pitch controller comprises an open loop controller with a derivative term.

8. The system defined in claim 1 wherein the wound rotor induction generator comprises a non-slip ring induction generator.

9. The system defined in claim 1 wherein the torque controller comprises a dampening filter to reduce commanded torque based on detected oscillation motion between turbine blades and the generator.

10. A variable speed system comprising:
   a wound rotor induction generation means for generating power;
   a torque controlling means for controlling generator torque using field oriented control; and
   a pitch controlling means for performing pitch regulation based on generator rotor speed and operating independently of the torque controller.

11. The system defined in claim 10 wherein the pitch controlling means comprises a proportional, integral derivative (PID) pitch controller.

12. A variable speed wind turbine system comprising::
   a wound rotor induction generator;
   a torque controller coupled to the generator to control generator torque using field oriented control; and
   a proportional, integral derivative (PID) pitch controller coupled to the generator to perform pitch regulation based on generator rotor speed.

13. The system defined in claim 12 wherein the wound rotor induction generator comprises a non-slip ring induction generator.

14. The system defined in claim 12 wherein the power controller controls the generator power and torque as a function of generator speed.

15. The system defined in claim 12 wherein the power controller controls the generator power from a power look up table (LUT) as a function of generator speed using field oriented control (FOC).

16. The system defined in claim 12 wherein the power controller comprises a look up table (LUT) of power and corresponding generator rotor speeds, and wherein the power controller interpolates the LUT using a measured generator rotor speed to determine a target output power, from which the torque controller determines a desired generator torque using the measured generator rotor speed.

17. The system defined in claim 16 wherein the power controller causes the generator to follow a predetermined power-speed curve encoded in the LUT.

18. The system defined in claim 12 wherein the power controller comprises:
   a LUT encoding a predetermined power-speed curve, wherein the LUT outputs a target output power in response to a measured generator rotor speed;
   a comparator to generate a power error indication based on a comparison of actual output power to the target output power;
   a proportional, integral (PI) controller coupled to the power error indication to generate an adjusted actual output power in response to the calculated power error indication; and
   a divider to generate a commanded torque in response to the measured generator rotor speed and the adjusted actual output power.

19. The system defined in claim 18 further comprising a feedforward dampening term filter coupled to change the commanded torque in response to the measured generator rotor speed.

20. The system defined in claim 12 wherein the power controller controls generator torque by commanding a required rotor current vector which interacts with an identified flux vector to produce a desired generator torque.

21. The system defined in claim 12 wherein the power controller controls torque at least from cut-in to rated wind speeds.

22. The system defined in claim 12 wherein the power controller controls torque from cut-in to rated wind speeds.

23. The system defined in claim 12 wherein the power controller causes the generator to follow a predetermined power-speed curve.

24. The system defined in claim 12 wherein the power controller commands a preselected constant torque to slow the wound rotor.

25. The system defined in claim 24 wherein the preselected constant torque comprises a maximum preselected constant torque.

26. The system defined in claim 12 further comprising a generator speed indication coupled to inputs of the power controller and the PID controller.

27. The system defined in claim 12 wherein the power controller operates independently of the PID pitch controller.

28. The system defined in claim 12 wherein the PID pitch controller comprises a closed loop PID controller with pitch angle being fed back.

29. The system defined in claim 12 wherein the PID pitch controller comprises an open loop controller with a derivative term.

30. The system defined in claim 12 wherein the PID pitch controller generates a pitch velocity to perform pitch regulation.

31. The system defined in claim 12 further comprises a wind turbine having at least one blade coupled to the generator, and wherein the PID pitch controller controls generator rotor speed by pitching said at least one blade.

32. The system defined in claim 31 wherein the PID pitch controller pitches said at least one blade based on a difference in actual generator rotor speed and commanded generator rotor speed.

33. The system defined in claim 12 further comprising:
   a comparator to generate speed error indication based on a comparison between a measured generator rotor speed and a target generator rotor speed, and wherein the PID pitch controller generates an output pitch velocity value in response to the speed error indication; and
   a non-linear LUT coupled to output a command voltage to drive a proportional valve to effect pitching action in response to the pitch velocity value.

* * * * *